US012291258B2

United States Patent
Hartenstine et al.

(10) Patent No.: US 12,291,258 B2
(45) Date of Patent: May 6, 2025

(54) CARRYCOT WITH COUPLER FOR ATTACHING TO A CARRIAGE, STAND, OR OTHER SUPPORT STRUCTURE

(71) Applicant: Wonderland Switzerland AG, Steinhausen (CH)

(72) Inventors: Curtis M. Hartenstine, Birdsboro, PA (US); John E. Huntley, Philadelphia, PA (US); Lance J. Clemmer, Mohnton, PA (US)

(73) Assignee: Wonderland Switzerland AG, Steinhausen (CH)

( * ) Notice: Subject to any disclaimer, the term of this patent is extended or adjusted under 35 U.S.C. 154(b) by 149 days.

(21) Appl. No.: 17/922,849

(22) PCT Filed: May 7, 2021

(86) PCT No.: PCT/US2021/031285
§ 371 (c)(1),
(2) Date: Nov. 2, 2022

(87) PCT Pub. No.: WO2021/226453
PCT Pub. Date: Nov. 11, 2021

(65) Prior Publication Data
US 2023/0165386 A1 Jun. 1, 2023

Related U.S. Application Data

(60) Provisional application No. 63/021,974, filed on May 8, 2020.

(51) Int. Cl.
*B62B 7/14* (2006.01)
*A47D 9/00* (2006.01)
*A47D 13/02* (2006.01)

(52) U.S. Cl.
CPC .............. *B62B 7/142* (2013.01); *A47D 9/005* (2013.01); *A47D 9/008* (2022.08); *A47D 9/012* (2022.08); *A47D 9/016* (2022.08); *A47D 13/02* (2013.01)

(58) Field of Classification Search
CPC ........ A47D 9/008; A47D 13/02; A47D 9/016; A47D 9/012; A47D 9/005; B62B 7/142
See application file for complete search history.

(56) References Cited

U.S. PATENT DOCUMENTS 9,200,746 B2   12/2015   Xiao et al.
10,023,218 B2   7/2018   Paxton et al.
(Continued)

FOREIGN PATENT DOCUMENTS

CN   110182251 A   8/2019

OTHER PUBLICATIONS

International Search Report and Written Opinion for Application No. PCT/US2021/031285 dated Aug. 30, 2021.

*Primary Examiner* — Milton Nelson, Jr.
(74) *Attorney, Agent, or Firm* — Volpe Koenig

(57) ABSTRACT

In one example, a carrycot couples to a support frame to support the carrycot above a support surface. The carrycot has a carrycot frame having a first side and a second side that are spaced from one another so as to define a space therebetween that supports a child therein. The carrycot has a set of attachment features that is disposed at the first side and removably attaches to a bayonet of the support frame. The set of attachment features includes (1) a bayonet receptacle that receives a first portion of the bayonet and (2) a plunger that is spaced below the bayonet receptacle with respect to a vertical direction and is configured to engage an opening in a second portion of the bayonet.

19 Claims, 14 Drawing Sheets

(56) References Cited

U.S. PATENT DOCUMENTS

2007/0187914 A1    8/2007   Jane Santamaria
2011/0278810 A1    11/2011   Winterhalter et al.

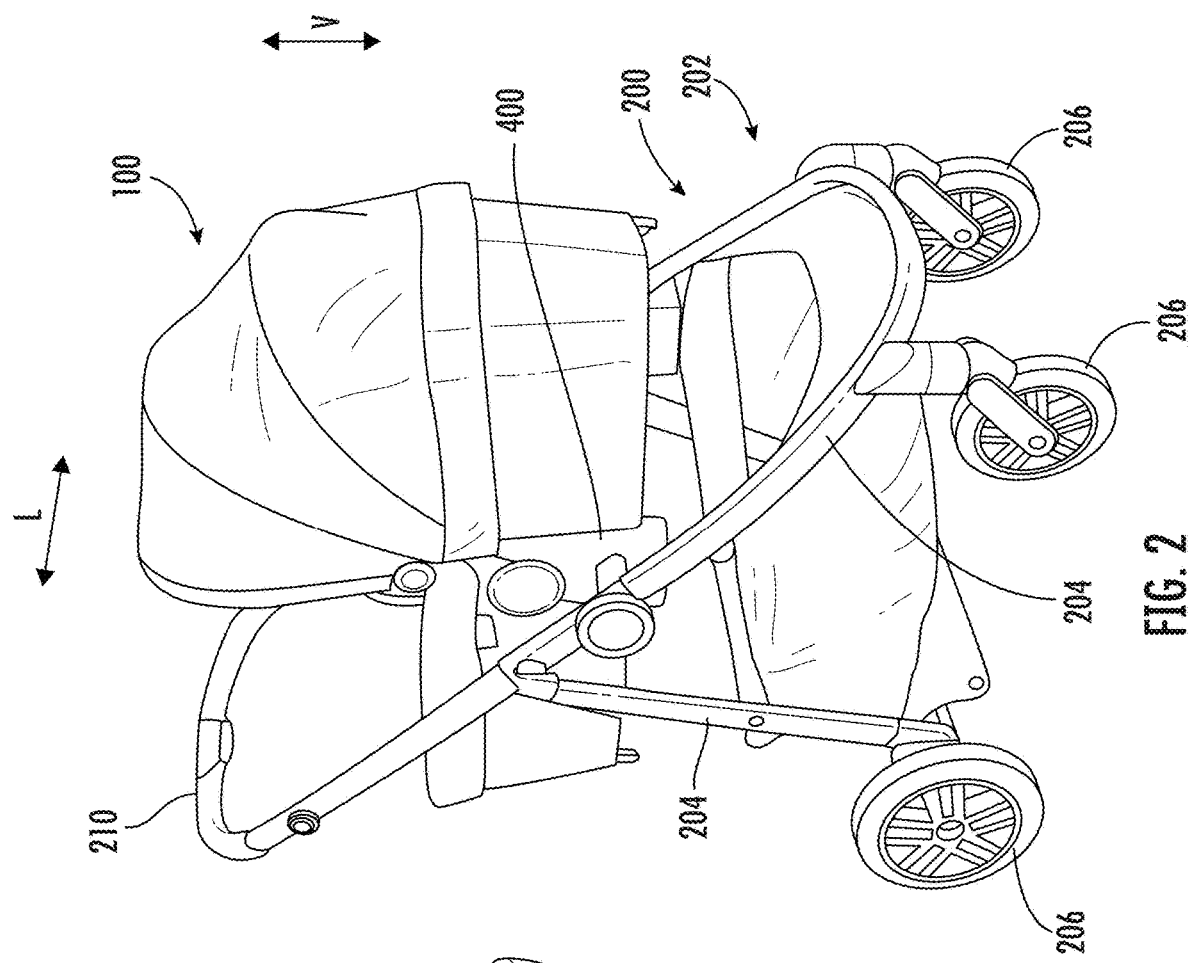
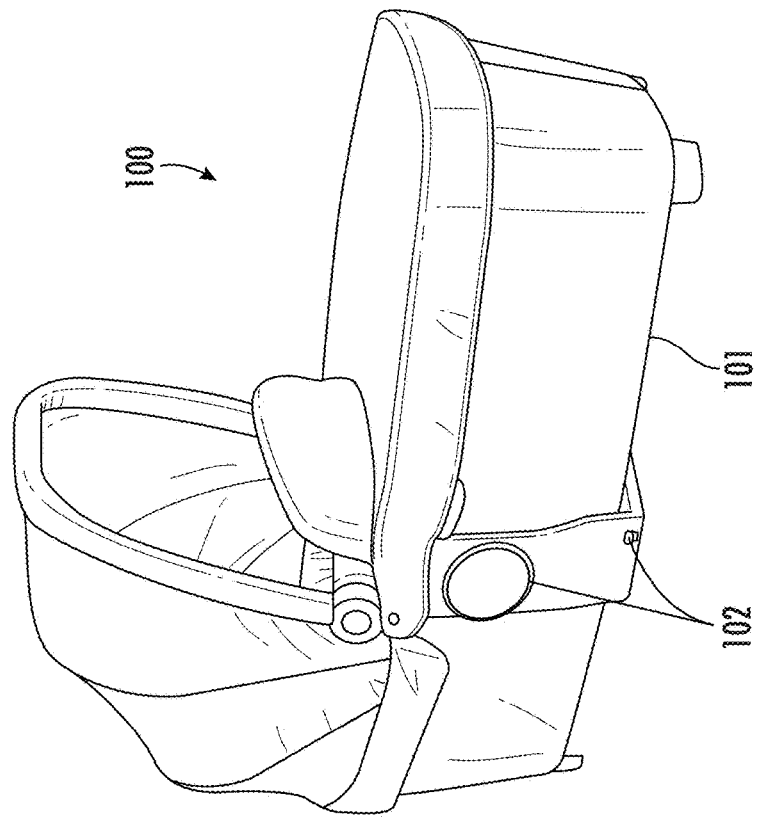

CARRYCOT WITH COUPLER FOR ATTACHING TO A CARRIAGE, STAND, OR OTHER SUPPORT STRUCTURE

CROSS-REFERENCE TO RELATED APPLICATIONS

This application is a National Stage 371 filing of International Application No. PCT/US2021/031285, filed on May 7, 2021, which claims priority to U.S. Provisional Application No. 63/021,974, filed May 8, 2020, the disclosures of which are both hereby incorporated by reference as if set forth in its entirety herein.

TECHNICAL FIELD

The present disclosure relates generally to child carriers, and in particular, to child carriers such as carrycots and systems having carrycots.

BACKGROUND

Carrycots are portable cots or bassinets that can be used to transport infants. A conventional carrycot includes a frame that defines a receiving space for the infant, and soft goods attached to the frame to provide comfortable surfaces for the infant. A conventional carrycot can include a handle or pair of handles that a caregiver can grasp to carry the carrycot. In addition, a conventional carrycot can include attachment features to attach the carrycot to a stroller.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIG. 1 shows a perspective view of a carrycot according to one example;

FIG. 2 shows a perspective view of the carrycot of FIG. 1 coupled to a carriage according to one example;

DETAILED DESCRIPTION

Figure 4:
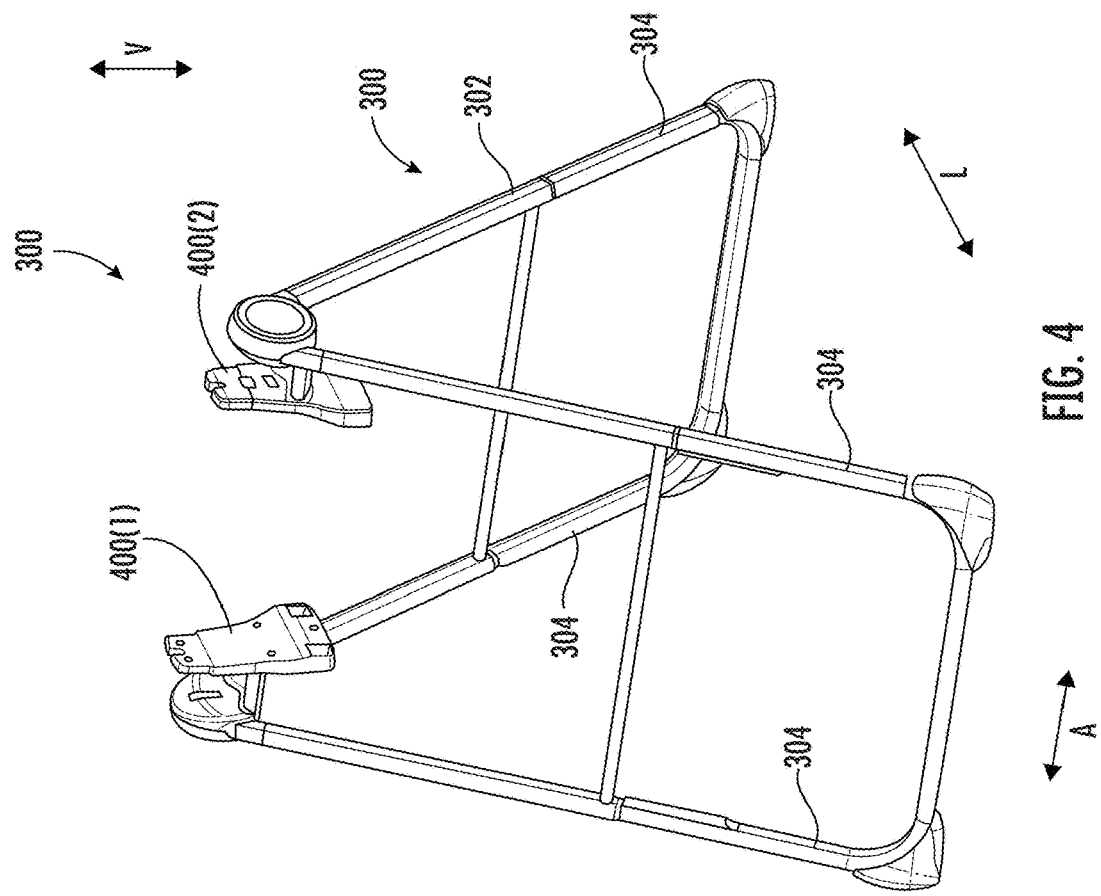
FIG. 4 shows a perspective view of the stand of FIG. 3 according to one example.

Referring to FIGS. 1 to 4, in general, a carrycot 100 of the disclosure is configured to be removably coupled to a support frame to support the carrycot 100 above a support surface, such as a floor. The support frame can be, for example, a frame of a carriage 200 or a stand 300, and the carrycot 100 can comprise at least one set 102 of attachment features that enables the carrycot 100 to be removably coupled to at least one bayonet of a support frame. In some examples, the carrycot 100 can have first and second sets 102(1) and 102(2) of attachment features positioned at opposing sides of the carrycot 100, where the first and second sets 102(1) and 102(2) of attachment features are configured to removably couple to first and second bayonets (e.g., 400(1), 400(2)), respectively, of a support frame.

Referring more specifically to FIG. 2, in some examples, the support frame can be a frame 202 of a carriage 200 such as a stroller. The frame 202 can comprise a plurality of legs 204, such as at least three legs 204, or such as at least four legs 204. The carriage 200 comprises a plurality of wheels 206, such as three wheels 206 or four wheels 206, attached to the frame 202 such that the wheels 206 are configured to translate the frame 202 along the support surface. FIG. 2 shows one specific example in which the carriage 200 comprises four legs 204 and four wheels 206. In particular, the carriage 200 comprises first and second rear legs 204 and first and second front legs 204. The rear legs 204 are spaced from one another along a lateral direction A. The front legs 204 are spaced from one another along the lateral direction A. At least a portion of the front legs 204, such as lower ends of the front legs 204, are offset from the rear legs 204 along a longitudinal direction L, perpendicular to the lateral direction A. The legs 204 are configured to support the carrycot 100 such that the carrycot 100 is spaced from the support surface along a vertical direction V, perpendicular to both the lateral direction A and the longitudinal direction L.

The carriage 200 can comprise at least one bayonet 400 disposed on at least one side of the carriage 200. In some examples, the carriage 200 can comprise first and second bayonets 400, disposed on opposing sides of the carriage 200. Note that, in FIG. 2, the second bayonet 400 is disposed on the side of the carriage 200 that is behind the carrycot 100 and thus is not visible in the view of FIG. 2. The opposing sides, and hence the first and second bayonets 400, can be spaced from one another along the lateral direction A. In some examples, the carriage 200 can comprise a push handle 210 that extends upwards from the frame 202. The push handle 210 can extend above the carrycot 100 when the carrycot 100 is coupled to the carriage 200. The push handle 210 is configured to be engaged by a caregiver to push the carriage 200 along the support surface.

Figure 3:
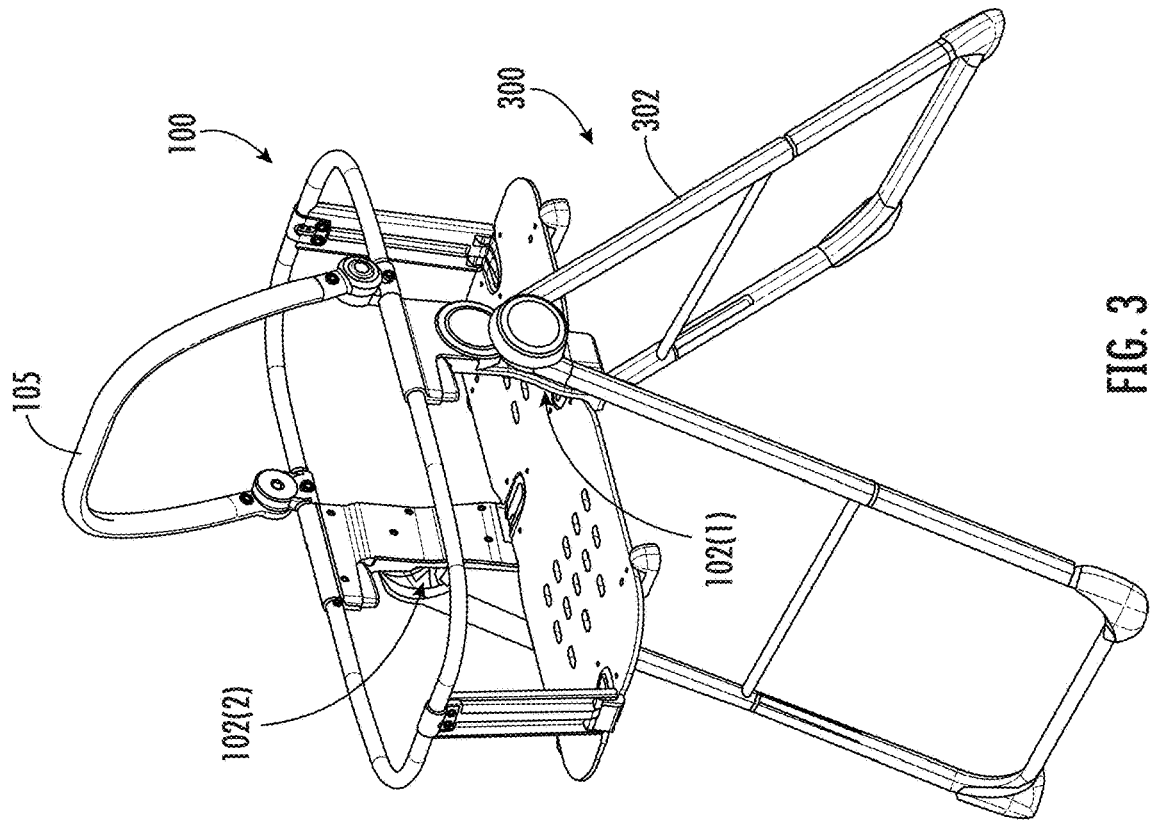
FIG. 3 shows a perspective view of a carrycot coupled to a wheelless stand according to one example, with soft goods removed from the carrycot.

Turning to FIG. 3, in other examples, the support frame can be a frame 302 of a wheelless stand 300. The frame 302 comprises at least one leg 304, such as at least two legs 304, such as at least three legs 304, such as at least four legs 304. FIG. 3 shows one specific example in which the stand 300 comprises four legs 304. In particular, the stand 300 comprises first and second rear legs 304 and first and second front legs 304. The rear legs 304 are spaced from one another along the lateral direction A. The front legs 304 are spaced from one another along the lateral direction A. At least a portion of the front legs 304, such as lower ends of the front legs 304, are offset from the rear legs 304 along the longitudinal direction L. The legs 304 are configured to support the carrycot 100 such that the carrycot 100 is spaced from the support surface along the vertical direction V. The stand 300 can comprise at least one bayonet 308(1), 308(2) disposed on at least one side of the stand 300. For example, the stand 300 can comprise first and second bayonets 308(1) and 308(2), disposed on opposing sides of the stand 300. The opposing sides can be spaced from one another along the lateral direction A.

Figure 5:
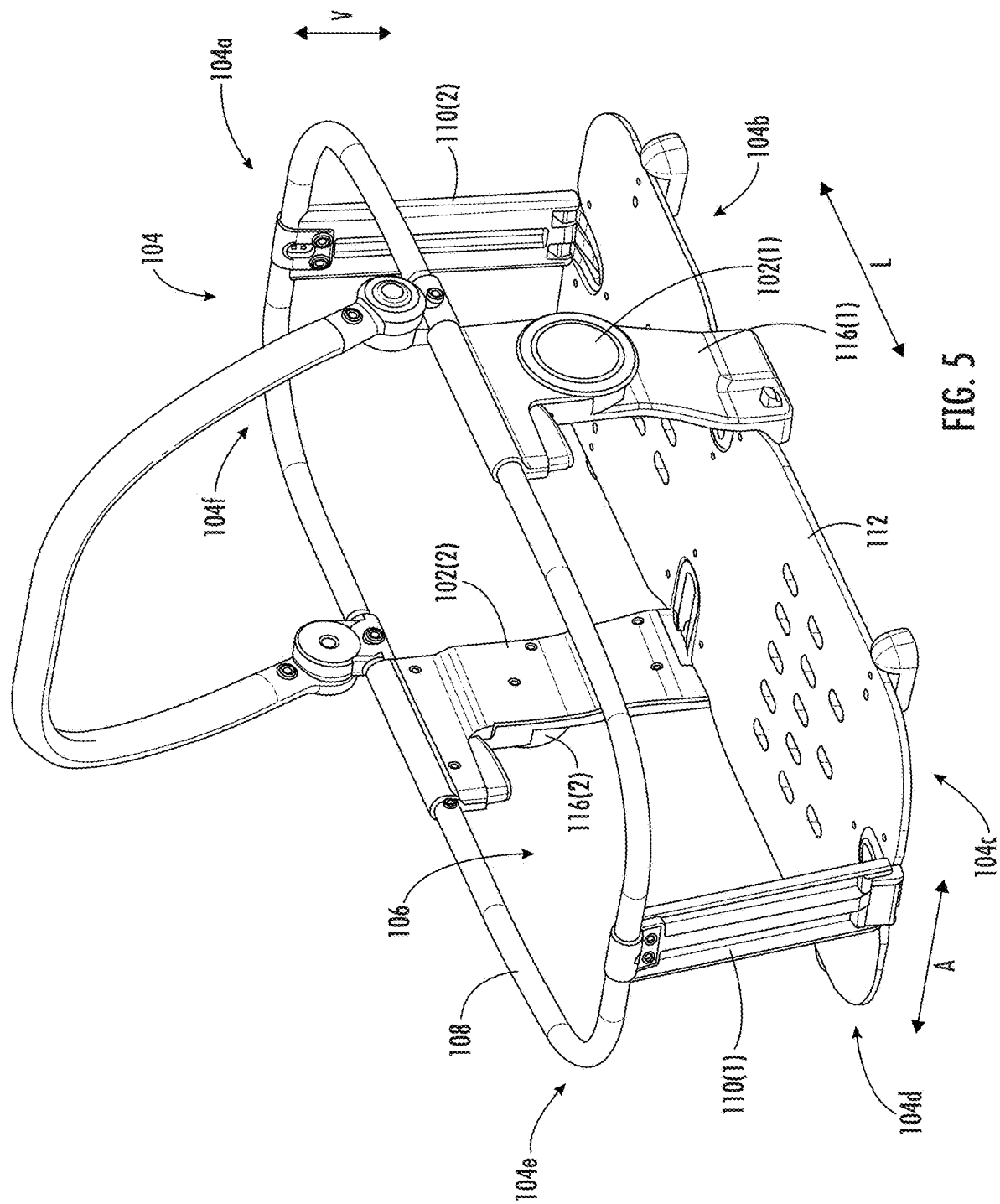
FIG. 5 shows a perspective view of a frame of the carrycot of FIG. 1 according to one example, with soft goods removed.
Figure 6:
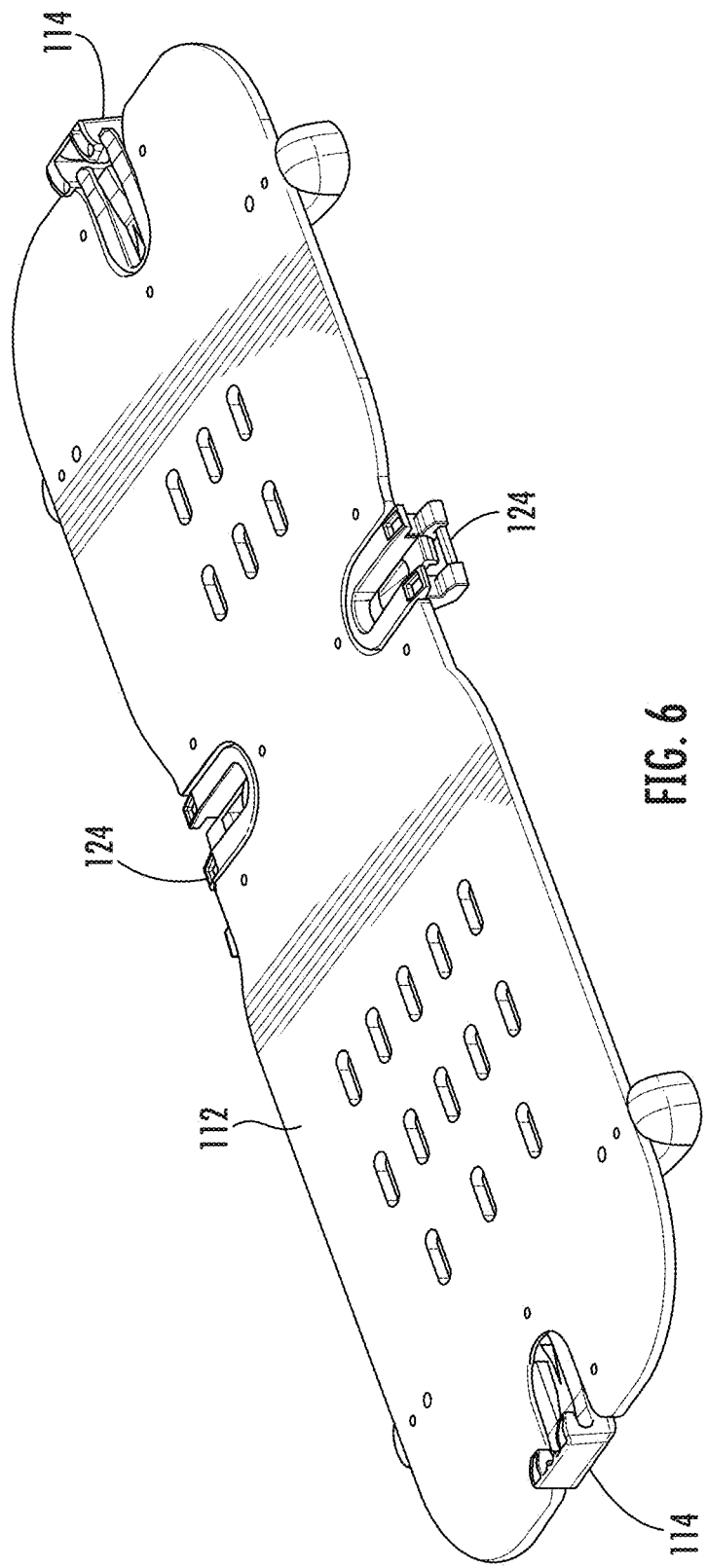
FIG. 6 shows a perspective view of a bottom wall of the carrycot of FIG. 1.

Turning to FIG. 5, a frame 104 of the carrycot 100 is shown according to one example. The carrycot 100 can additionally comprise soft goods 101 (shown in FIG. 1) attached to the frame 104 to provide comfortable surfaces for the child when the child is positioned within the carrycot 100. The frame 104 can comprise an upper end 104a and a lower end 104b that are offset from one another along the vertical direction V. The frame 104 can comprise a first side 104c and a second side 104d that are offset from one another along the lateral direction A. The frame 104 can comprise a first end 104e and a second end 104f that are offset from one another along the longitudinal direction L. The frame 104 can have a length from the first end 104e to the second end 104f that is greater than a width of the frame 104 from the first side 104c to the second side 104d. The frame 104 defines a receiving space 106 that extends into the upper end 104a towards the lower end 104b. The receiving space 106 is closed at the lower end 104b. The receiving space 106 is disposed between the first and second sides 104c and 104d and between the first and second ends 104e and 104f.

The frame 104 can comprise an upper rim 108 disposed at the upper end 104a. In some examples, the carrycot 104 can comprise a handle 105 that extends up from the upper rim 108. The handle 105 can be grasped by a caregiver to carry the carrycot 100. The upper rim 108 can extend along a plane that extends along the lateral direction A and the longitudinal direction L. The upper rim 108 can define a closed shape, such as a rectangle, a rectangle with rounded corners, or an oval. The upper rim 108 can comprise a tube or bar that is curved (e.g., bent) to define the closed shape. The upper rim 108 can be formed from a metal or other suitably rigid material. The carrycot 100 can comprise a bottom wall 112 disposed at the lower end 104b. The bottom wall 112 can be spaced below the upper rim 108. The bottom wall 112 can define a surface that supports the child when the child is positioned in the carrycot 100. The bottom wall 112 can extend from the first side 104c to the second side 104d. The bottom support wall 112 can extend from the first end 104e to the second end 104f. The bottom wall 112 can have a substantially planar shape in a plane that extends along the lateral direction A and the longitudinal direction L. The bottom wall 112 can be formed from a rigid medium density particle board, wood, a polymer, or any other suitably rigid material.

Figure 7:
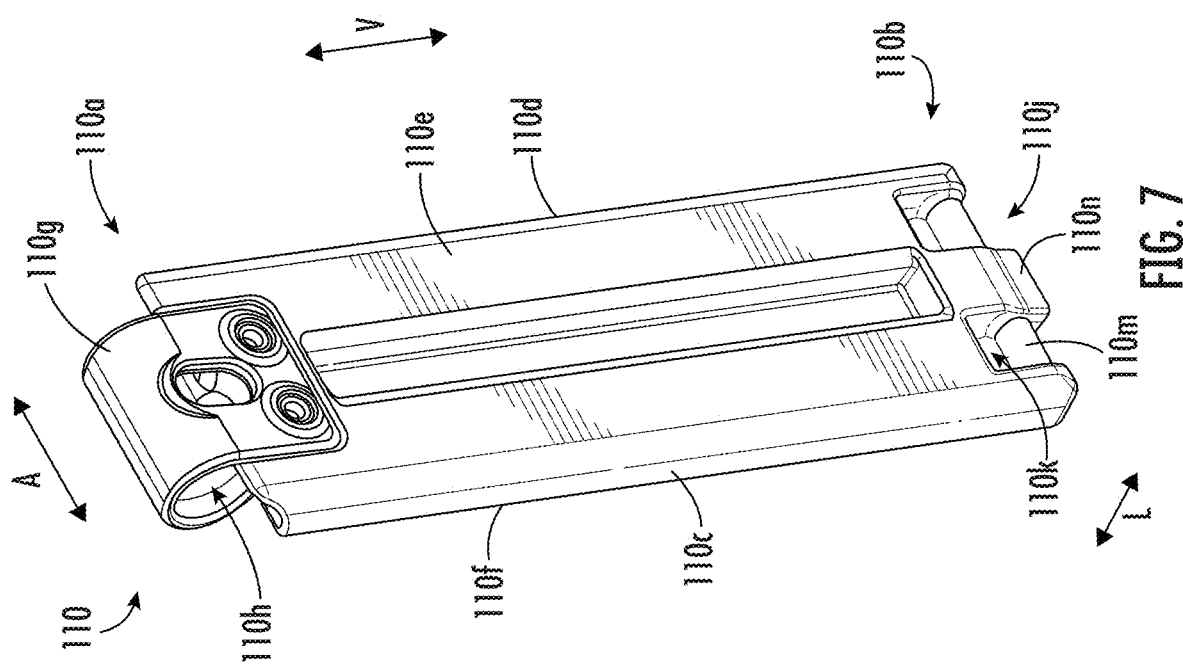
FIG. 7 shows a perspective view of a support of the frame of FIG. 5 according to one example.

With reference to FIGS. 5 and 7, the frame 104 can comprise at least one support 110, where each support 110 extends upwards from the lower end 104b and spaces the upper rim 108 entirely from the lower end 104b. For example, the frame 104 can comprise a first support 110(1) disposed at the first end 104e and a second support 110(2) disposed at the second end 104f. Each support 110 can be coupled to the upper rim 108 and the bottom wall 112. Each support 110 can comprise an upper end 110a and a lower end 110b that are spaced from one another along the vertical direction V. Each support 110 can have a first side 110c, and a second side 110d opposite the first side 110c. Each support 110 can have an inner side 110e that faces towards the receiving space 106 of the carrycot 100 and an outer side 110f, opposite the inner side 110e. In some examples, the inner and outer sides 402 and 404 can be offset from one another along the longitudinal direction A. In some examples, each support 110 can have a height from the upper end 110a to the lower end 110b that is greater than a width from the first side 110c to the second side 110d, and a width from the first side 110c to the second side 110d that is greater than a thickness from the inner side 110e to the outer side 110f. However, it will be understood that other dimensions are contemplated. Each support can be formed from a polymer, such as a molded plastic, or any other suitably rigid material.

Each support 110 can have an upper coupler 110g that is configured to couple to the upper rim 108. The upper coupler 110g can be disposed at the upper end 110a of the support 110. The upper coupler 110g can be any suitable coupler that can couple the support to the upper rim 108. In some examples, each support 110 can be rotatably coupled to the upper rim 108. As one such example, the upper coupler 110g can define an opening 110h therein that is configured to receive the upper rim 108 therein such that the upper rim 108 can be rotated within the opening 110h. Each support 110 can be rotated to transition the carrycot 100 between an expanded configuration and a collapsed configuration, wherein the at least one support 110 spaces the upper rim 108 further from the lower end 104b when the carrycot 100 is in the expanded configuration than when the carrycot 100 is in the collapsed configuration. In alternative examples, each support 110 can be removably coupled to the upper rim 108 such that the carrycot 100 can be transitioned to the collapsed configuration by decoupling each support 110 from the upper rim 108.

Figure 8:
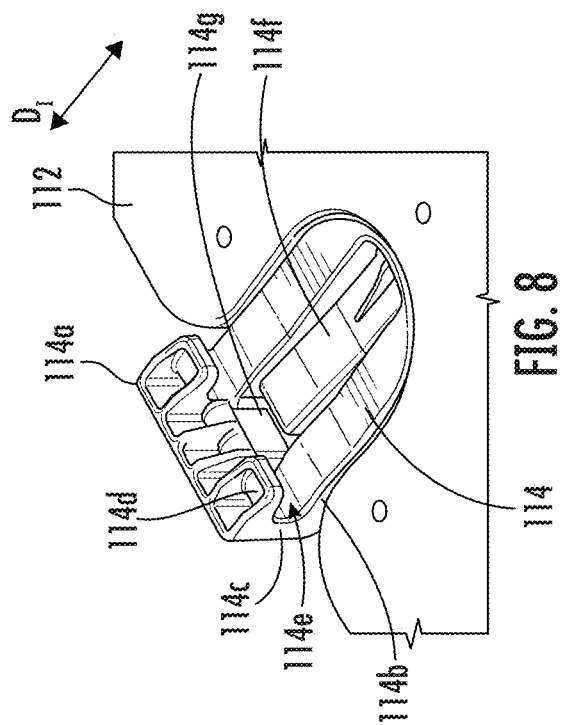
FIG. 8 shows a perspective view of a coupler of the bottom wall of FIG. 6 that is configured to couple to the support of FIG. 7.
Figure 9:
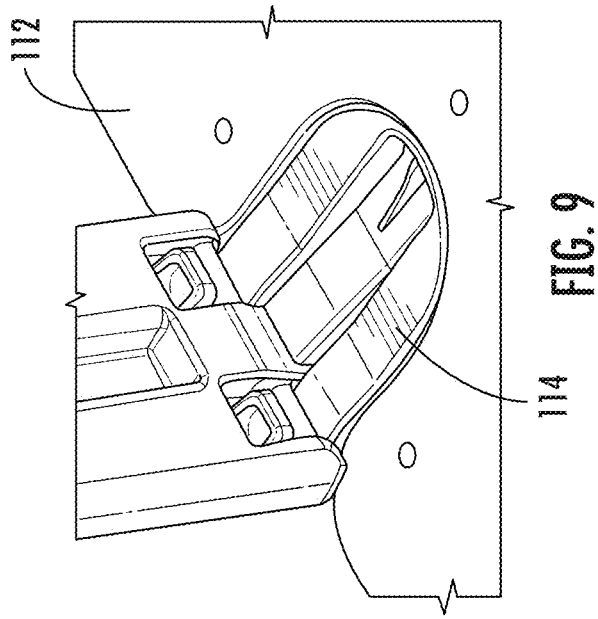
FIG. 9 shows a perspective view of the coupler of FIG. 8 being coupled to the support of FIG. 7.

Referring to FIGS. 7 to 9, each support 110 can be coupled to the bottom wall 112. Each support 110 can have a lower coupler 110j that is configured to couple to the bottom wall 112, such as to a coupler 114 of the bottom wall 112. Each coupler 114 of the bottom wall 112 can be fixedly attached to the bottom wall 112. In some examples, the coupler 114 can be formed from a molded plastic. The carrycot frame 104 can be devoid of a lower rim or tube that couples each support 110 to the bottom wall 112, and instead, each support 110 can directly couple to the bottom wall 112 via the couplers 110*j* and 114.

The lower coupler 110*j* can be any suitable coupler that can couple the support to the bottom wall 112. The lower coupler 110*j* and bottom wall coupler 114 can be configured to couple to one another so as to fix the bottom wall 112 and the support 110 to one another with respect to movement along at least one, such as all, of the longitudinal direction L, the lateral direction A, and the vertical direction V. One of the lower coupler 110*j* and the coupler 114 of the bottom wall 112 can define a plug, and the other can define a receptacle that receives the plug. In the example of FIGS. 7 to 9, the coupler 110*j* is configured as the plug and the coupler 114 is configured as the receptacle. In some examples, each support 110 can be removably coupled to the bottom wall 112. As one such example, the lower coupler 110*j* can define at least one opening 110*k* therethrough. The lower coupler 110*j* can comprise a crossmember 110*m* that extends into the opening 110*k*. The crossmember 110*m* can be disposed within the opening 110*k* such that the opening 110*k* is open above the crossmember 110*m*.

The coupler 114 can comprise a receptacle 114*a*. The receptacle 114*a* can have a first portion 114*b* attached to a body of the bottom wall 112 and extending along an insertion direction $D_I$, a second portion 114*c* that extends from the first portion 114*b* along the vertical direction V, and a third portion 114*d* that extends from the second portion 114*c* along a second direction, opposite the first direction, such that the first portion 114*b* and the third portion 114*d* are spaced from one another along the vertical direction V so as to define a recess 114*e* therebetween. The recess 114*e* can be configured to receive the crossmember 110*m* of the support 110 therein along the insertion direction $D_I$ such that the second portion 114*c* and the third portion 114*d* of the receptacle 114*a* limit movement of the crossmember 110*m* along the insertion direction $D_I$ and the vertical direction V, respectively. The coupler 114 can comprise a spring arm 114*f* having an engagement surface 114*g* that is configured to engage an engagement surface 110*n* of the support 110 so as to create an interference that prevents movement of the crossmember 110*m* out of the recess 114*e* along a direction opposite the insertion direction $D_I$. The spring arm 114*f* can be resiliently biased into an engagement position where the engagement surface 114*g* is in engagement with the engagement surface 110*n*. Further, the spring arm 114*f* can be configured to be engaged by a caregiver to flex along the vertical direction V to a position where the interference is removed such that the crossmember 110*m* can be removed from the recess 114*e*. Once the spring arm 114*f* is released, the spring arm 114*f* resiliently moves back to the engagement position.

Figure 10:
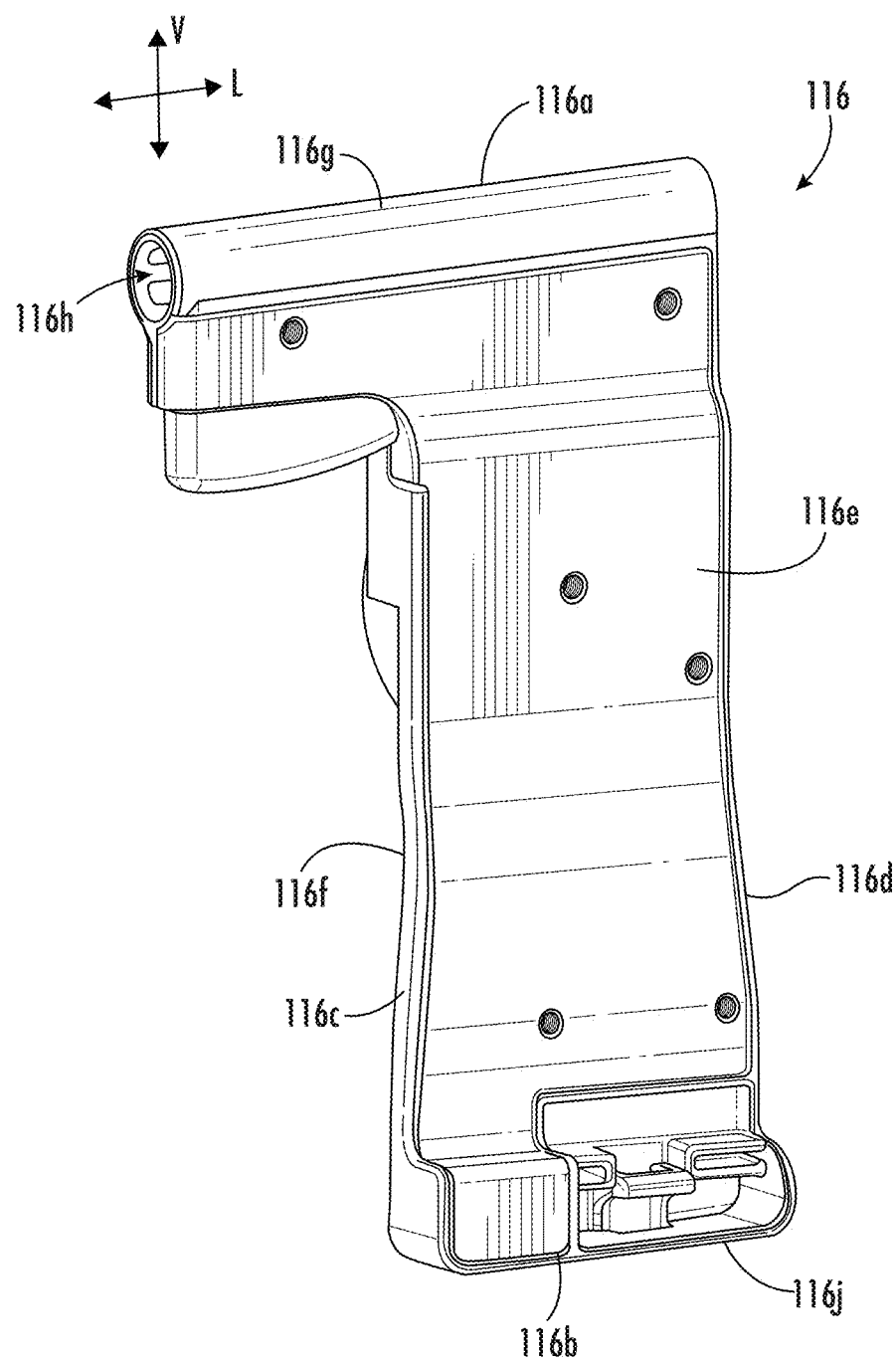
FIG. 10 shows a perspective view of an inner side of another support of the frame of FIG. 5 according to one example, the support including attachment features configured to attach to a support frame of a carriage or stand.
Figure 11:
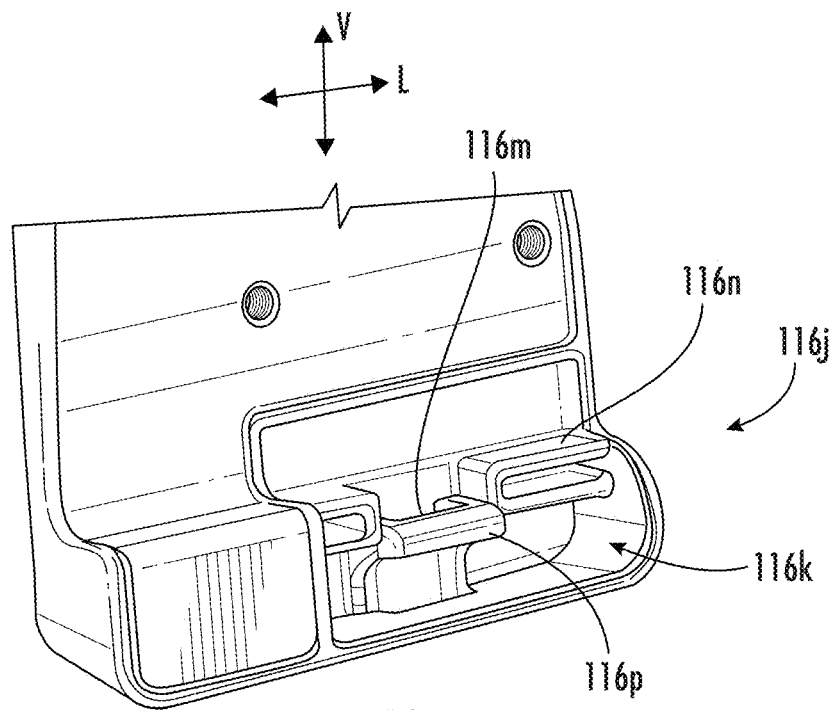
FIG. 11 shows an enlarged view of a coupler of the support of FIG. 10 according to one example, the coupler being configured to couple to the bottom wall of FIG. 6.
Figure 12:
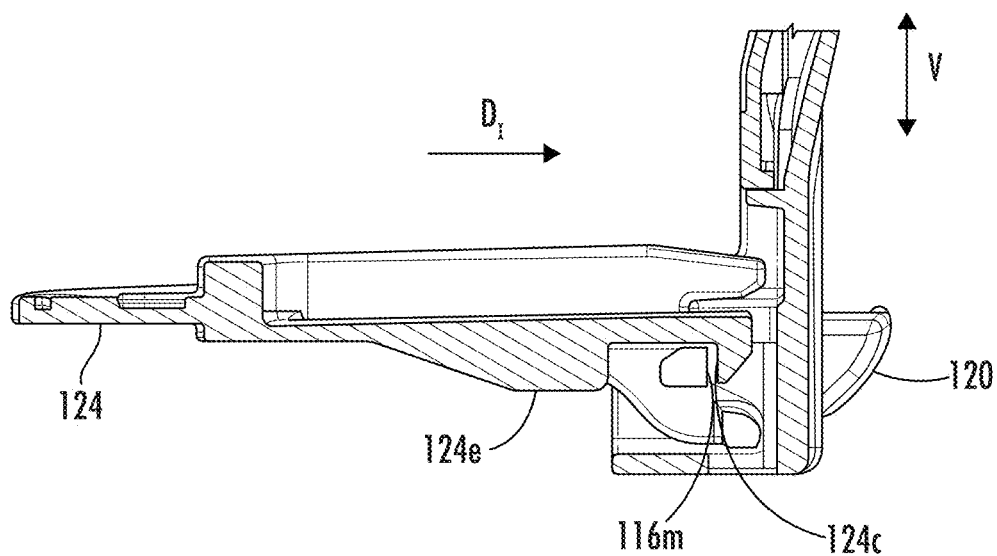
FIG. 12 shows a cross-sectional side view of the coupler of FIG. 11 being coupled to a coupler of the bottom wall of FIG. 6.
Figure 13:
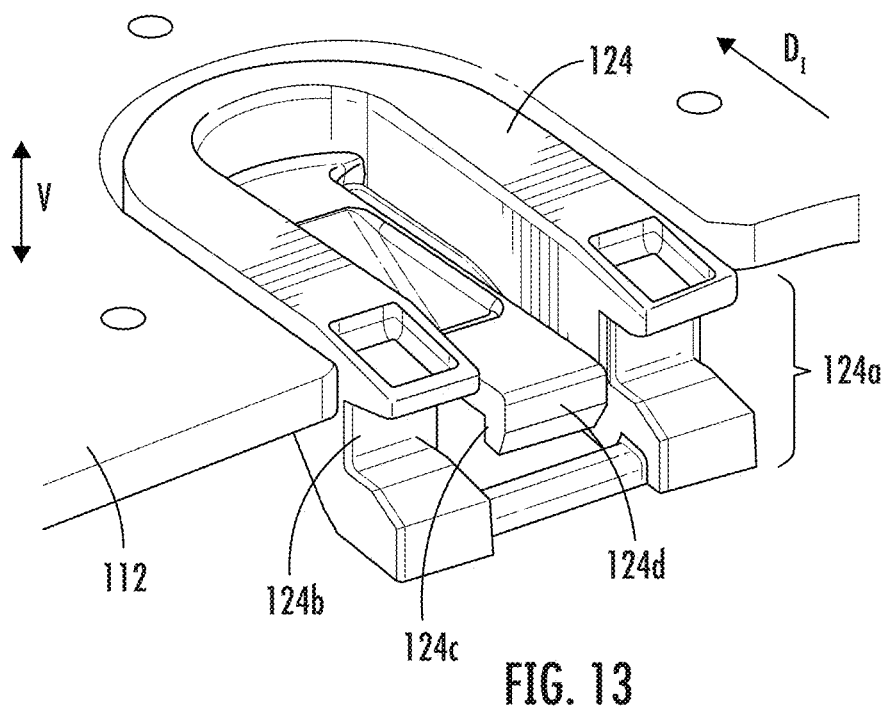
FIG. 13 shows a perspective view of the coupler of the bottom wall of FIG. 12.
Figure 14:
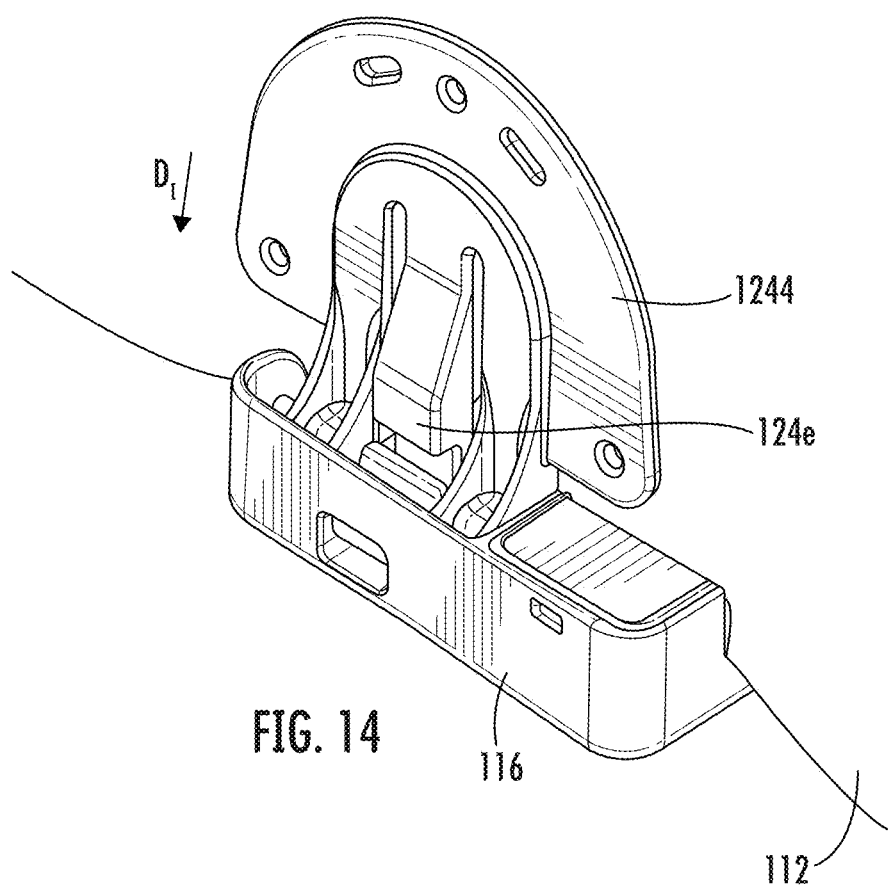
FIG. 14 shows a perspective view of the coupler of the bottom wall of FIG. 13 being coupled to the coupler of FIG. 11.

Turning now to FIGS. 5 and 10, the carrycot 100 comprises at least one set 102 of attachment features, where each set removably couples to a bayonet (e.g., 400, 400(1), 400(2)) of a support frame (e.g., 202, 302). Each set 102 of attachment features is disposed at a different side 104*c*, 104*d* of the carrycot 100. In some examples, the carrycot 100 can have first and second sets 102(1) and 102(2) of attachment features positioned at opposing sides of the carrycot 100, where the first and second sets 102(1) and 102(2) of attachment features are configured to removably couple to first and second bayonets 400(1), 400(2), respectively, of a support frame. The first set 102(1) can be disposed at the first side 104*c* of the carrycot 100 and the second set 102(2) can be disposed at the second side 104*d* of the carrycot 100.

In some examples, each set 102 of attachment features can be carried by a support 116. In other examples, each set 102 of attachment features need not be carried by a single support 116. Each support 116 can extend upwards from the lower end 104*b* and can space the upper rim 108 entirely from the lower end 104*b* along the vertical direction V. Each support 116 can be disposed at one of the first and second sides 104*c* and 104*d* of the carrycot 100. Each support 116 can provide structural stability between the upper rim 108 and the bottom wall 112. In some examples, the frame 104 can comprise a first support 116(1) (labeled in FIG. 5) disposed at the first side 104*c* and a second support 116(2) disposed at the second side 104*d*. Each support 116 can be spaced from a support 110 so as to define an opening therebetween. The soft goods 101 (FIG. 1) can be attached to the frame 104 so as to cover the openings such that the soft goods 101 define sidewalls of the carrycot 100.

Each support 116 can be coupled to the upper rim 108 and the bottom wall 112. Each support 116 can comprise an upper end 116*a* and a lower end 116*b* that are spaced from one another along the vertical direction V. Each support 116 can have a first side 116*c*, and a second side 116*d* opposite the first side 116*c*. Each support 116 can have an inner side 116*e* that faces towards the receiving space 106 of the carrycot 100, and an outer side 116*f* opposite the inner side 116*e*. In some examples, each support 116 can have a height from the upper end 116*a* to the lower end 116*b* that is greater than a width from the first side 116*c* to the second side 116*d*, and a width from the first side 116*c* to the second side 116*d* that is greater than a thickness from the inner side 116*e* to the outer side 116*f*. However, it will be understood that other dimensions are contemplated. Each support can be formed from a polymer, such as a molded plastic, or any other suitably rigid material.

Each support 116 can have an upper coupler 116*g* that is configured to couple to the upper rim 108. The upper coupler 116*g* can be disposed at the upper end 116*a* of the support 116. The upper coupler 116*g* can be any suitable coupler that can couple the support to the upper rim 108. In some examples, each support 116 can be rotatably coupled to the upper rim 108. As one such example, the upper coupler 116*g* can define an opening 116*h* therein that is configured to receive the upper rim 108 therein such that the upper rim 108 can be rotated within the opening 116*h*. Each support 116 can be rotated to transition the carrycot 100 between an expanded configuration and a collapsed configuration, wherein the at least one support 116 spaces the upper rim 108 further from the lower end 104*b* when the carrycot 100 is in the expanded configuration than when the carrycot 100 is in the collapsed configuration. In alternative examples, each support 116 can be removably coupled to the upper rim 108 such that the carrycot 100 can be transitioned to the collapsed configuration by decoupling each support 116 from the upper rim 108.

Referring to FIGS. 11 to 14, each support 116 can be coupled to the bottom wall 112. Each support 116 can have a lower coupler 116*j* that is configured to couple to the bottom wall 112, such as to a bottom wall coupler 124 of the bottom wall 112. The lower coupler 116*j* and bottom wall coupler 124 can each be any suitable coupler that can couple the support 116 to the bottom wall 112. The lower coupler 116*j* and bottom wall coupler 124 can be configured to couple to one another so as to fix the bottom wall 112 and the support 116 to one another with respect to movement along at least one, such as all, of the longitudinal direction L, the lateral direction A, and the vertical direction V. The coupler 124 of the bottom wall 112 can be fixedly attached to the bottom wall 112. In some examples, the coupler 124 can be formed from a molded plastic. The carrycot frame 104 can be devoid of a lower rim or tube that couples each support 116 to the bottom wall 112, and instead, each support can directly couple to the bottom wall 112 via the couplers 116*j* and 124.

In some examples, each support 116 can be removably coupled to the bottom wall 112. One of the lower coupler 116*j* and the bottom wall coupler 124 can be configured as a plug, and the other one of the lower coupler 116*j* and the bottom wall coupler 124 can be configured as a receptacle that is configured to receive the plug. In the example of FIGS. 11 to 14, the lower coupler 116*j* is configured as the receptacle and the bottom wall coupler 124 is configured as the plug. The receptacle defines an opening 116*k* therein, and the plug defines a protrusion 124*a* that is configured to be received in the opening 116*k*. The receptacle can define an engagement surface 116*n*, and the plug can define an engagement surface 124*b* that is configured to engage the engagement surface 116*n* of the receptacle to limit an insertion depth of the plug into the receptacle along an insertion direction $D_I$. The receptacle can define a latch surface 116*m*, and the plug can define a latch surface 124*c* that is configured to engage the latch surface 116*m* of the receptacle to prevent the plug from being removed along a removal direction, opposite the insertion direction $D_I$.

In some examples, the latch surface 116*m* of one of the plug and the receptacle can be disposed on a crossmember 116*p*. The crossmember 116*p* can extend along the longitudinal direction L. The crossmember 116*p* can be disposed in an opening of the one of the plug and the receptacle, such as in the opening 116*k* of the receptacle. In some examples, the latch surface 124*c* of one of the plug and the receptacle can be disposed on a spring arm 124*d*. The spring arm 124*d* can be configured to engage the crossmember 116*p*. The spring arm 124*d* can comprise an actuation surface 124*e* that is configured to be engaged by a caregiver to move the spring arm 124*d* from a latched position, wherein the latch surfaces 116*m* and 124*c* engage one another to secure the plug to the receptacle, to an unlatched position, wherein the latch surfaces 116*m* and 124*c* are disengaged from one another to allow the plug to be removed from the receptacle. The spring arm 124*d* can be resiliently biased towards the latched position. In some examples, the spring arm 124*d* can be configured to flex along the vertical direction V.

Figure 17:
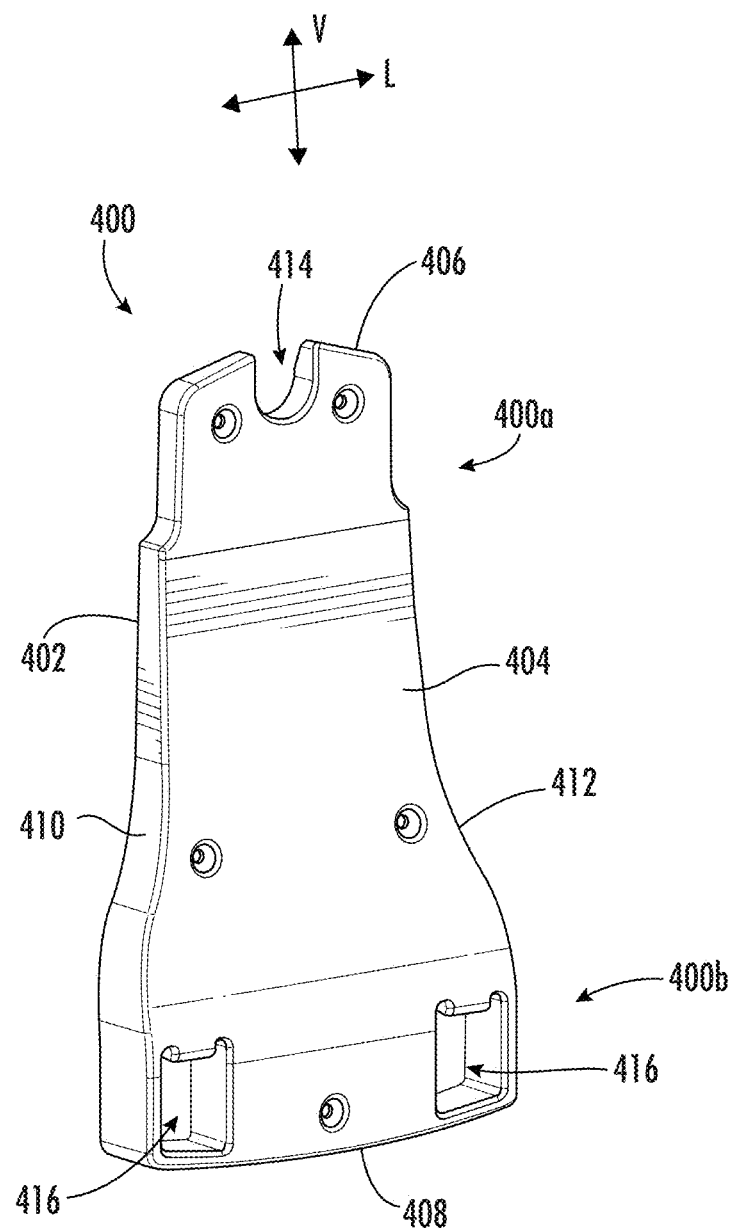
FIG. 17 shows a bayonet according to one example that can be used to implement a bayonet of the carriage of FIG. 2 or the stand of FIG. 4.
Figures 18, 19:
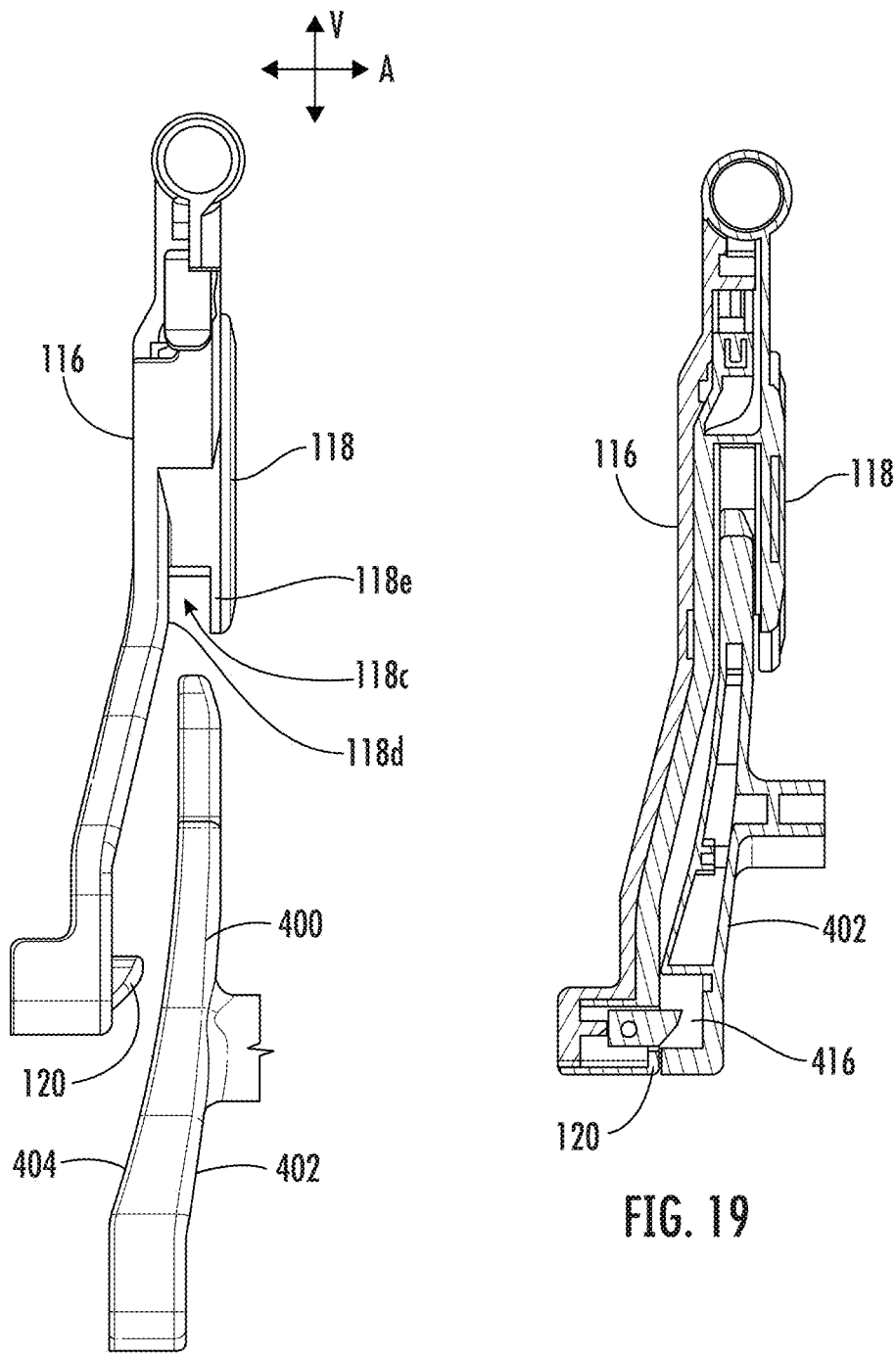
FIG. 18 shows a side view of the bayonet of FIG. 17 being inserted into a receptacle of the support of FIG. 15.
FIG. 19 shows a cross-sectional view of the bayonet of FIG. 17 and support of FIG. 15, where the bayonet is received in the receptacle.

Referring briefly to FIG. 17, as discussed above, each set 102 of attachment features can be configured to couple to a bayonet 400. An example of a bayonet 400 is shown that can be used to implement each of the bayonets 400, 400(1), 400(2). The bayonet 400 can have a first portion 400*a*, and a second portion 400*b* spaced below the first portion 400*a* along the vertical direction V. As will be described further below, the first portion 400*a* is configured to couple to a first attachment feature 118 of the carrycot 100, and the second portion 400*b* is configured to couple to a second attachment feature 120 of the carrycot 100. The bayonet 400 comprises an inner side 402, and an outer side 404 that is offset from the inner side 402. In some examples, the inner and outer sides 402 and 404 can be offset from one another along the lateral direction A. The inner side 402 is configured to face the carrycot 100 when the carrycot 100 is coupled to the bayonet 400.

The bayonet 400 comprises an upper end 406 and a lower end 408 that are offset from one another along the vertical direction V. The first portion 400*a* of the bayonet 400 can include the upper end 406. In some examples, the second portion 400*b* of the bayonet 400 can include the lower end 408. In some examples, the upper end 406 can define a recess 414 that extends therein towards the lower end 408. The recess 414 can be configured to align the bayonet 400 within an attachment feature (e.g., a bayonet receptacle 118) of the carrycot 100 or can engage with a stop within the attachment feature that limits insertion of the bayonet 400 upwards into the attachment feature. The bayonet 400 comprises a first side 410 and a second side 412 that are offset from one another. In some examples, the first and second sides can be spaced from one another along the longitudinal direction L. The inner and outer sides 402 and 404 can extend between the first and second sides 410 and 412 and between the upper and lower ends 406 and 408. In some examples, the bayonet 400 can have a height from the upper end 406 to the lower end 408 that is greater than a width from the first side 410 to the second side 412, and the width from the first side 410 to the second side 412 can be greater than a thickness from the inner side 402 to the outer side 404.

The outer side 404 can define at least one opening 416 that extends therein towards the inner side 402. The at least one opening 416 can be disposed at the second portion 400*b*. In some examples, the at least one opening 416 can be offset from a midline ML of a body of the support 116 along the longitudinal direction L. In some examples, the outer side 404 can define first and second openings 416 that are spaced from one another along a direction that extends from the first side 410 to the second side 412. The first and second openings 416 can be disposed on opposing sides of the midline ML.

Referring to FIGS. 15 to 19, an example of a set 102 of attachment features that can be used to implement one or both of the sets 102(1) and 102(2) is shown. It will be understood that, in some examples, the set 102(2) of attachment features can be a mirror image of the set 102(1) of attachment features. Each set 102 of attachment features of the carrycot 100 defines a bayonet receptacle 118 configured to receive the first portion 400*a* of one of the bayonets (e.g., 400, 400(1), 400(2)) of the support frame (e.g., 202, 302). Each bayonet receptacle 118 has an upper end 118*a* and a lower end 118*b* that are offset from one another along the vertical direction V. The bayonet receptacle 118 has an opening 118*c* that extends upwards therein along the vertical direction V and that is configured to receive the first portion (e.g., 400*a*) of the bayonet therein. For example, the opening 118*c* can extend into the lower end 118*b* towards the upper end 118*a*. In some examples, the upper end 118*a* can limit, or prevent altogether, movement of the bayonet 400 upwards along the vertical direction V when the bayonet 400 is received in the receptacle 118. In some examples, the receptacle 118 can include a protrusion 118*h* that extends downward into the opening 118*c*. The protrusion 118*h* can be configured to be received in the recess 414 of the bayonet 400. The protrusion 118*h* and recess 414 can mate with one another so as to align the bayonet 400 within the receptacle 118. Additionally, or alternatively, the protrusion 118*h* and recess 414 can mate with one another so as to limit, or prevent altogether, movement of the bayonet 400 upwards along the vertical direction V when the bayonet 400 is received in the receptacle 118.

The receptacle 118 has an inner wall 118*d* (labeled in FIG. 18) and an outer wall 118*e* (labeled in FIG. 18) that are opposite one another along the lateral direction A. The inner and outer walls 118*d* and 118*e* can limit, or prevent altogether, movement of the bayonet 400 along the lateral direction A when the bayonet 400 is received in the receptacle 118. The receptacle 118 can have first and second sides 118*f* and 118*g* that are offset from one another along the longitudinal direction L. The first and second sides 118*f* and 118*g* can limit, or prevent altogether, movement of the bayonet 400 along the longitudinal direction L when the bayonet 400 is received in the receptacle 118.

Figure 20:
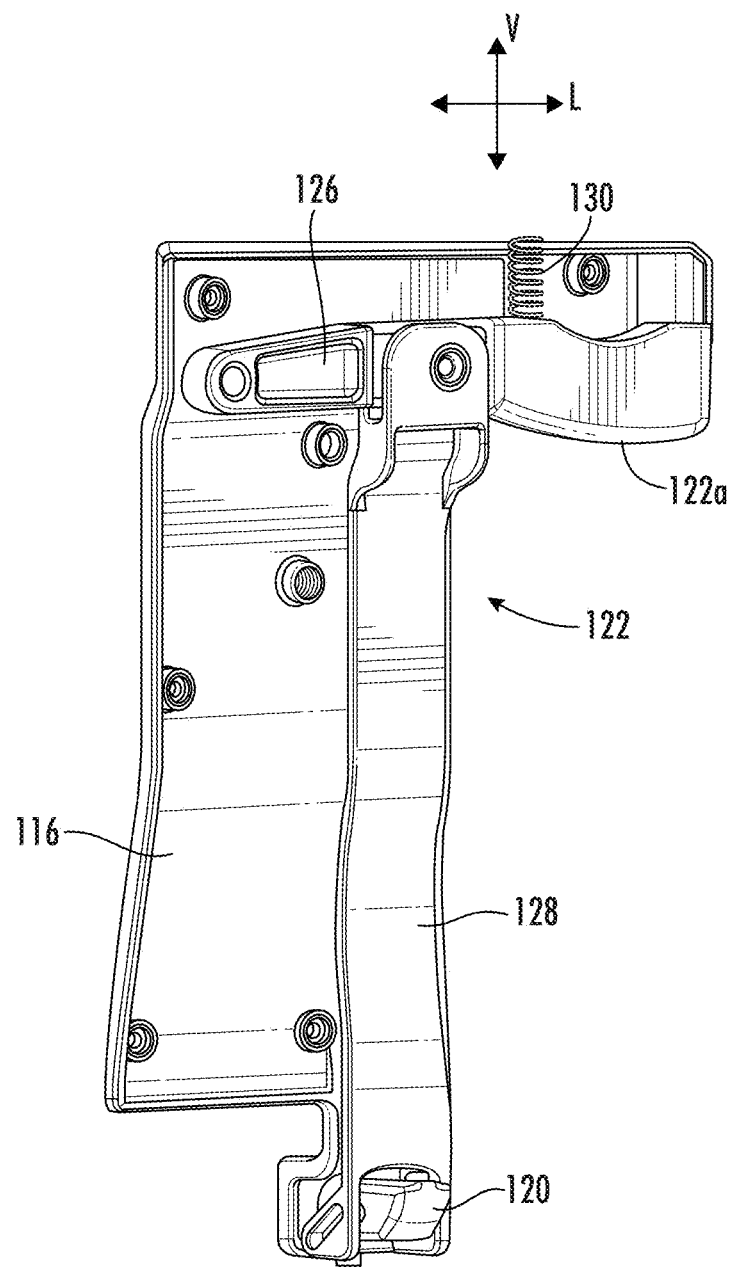
FIG. 20 shows a perspective view of the support of FIG. 15 with an outer surface removed to show an actuator that is configured to actuate a plunger of the support.
Figure 21:
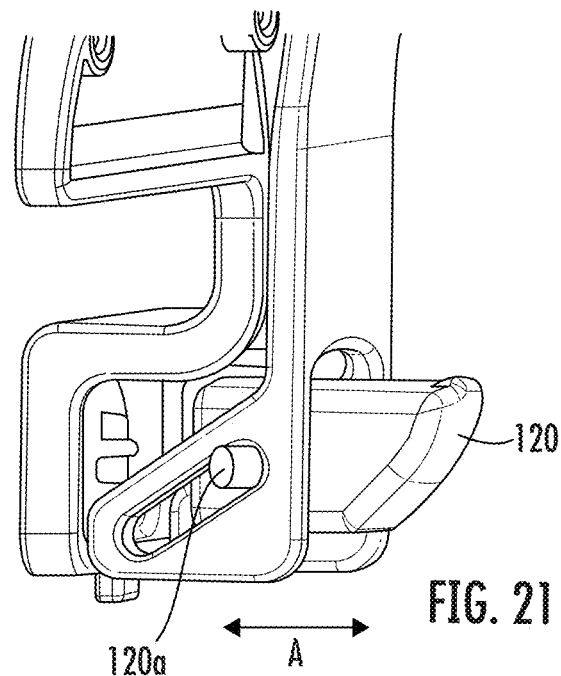
FIG. 21 shows a perspective view of the plunger of FIG. 20 in a latched position.
Figure 22:
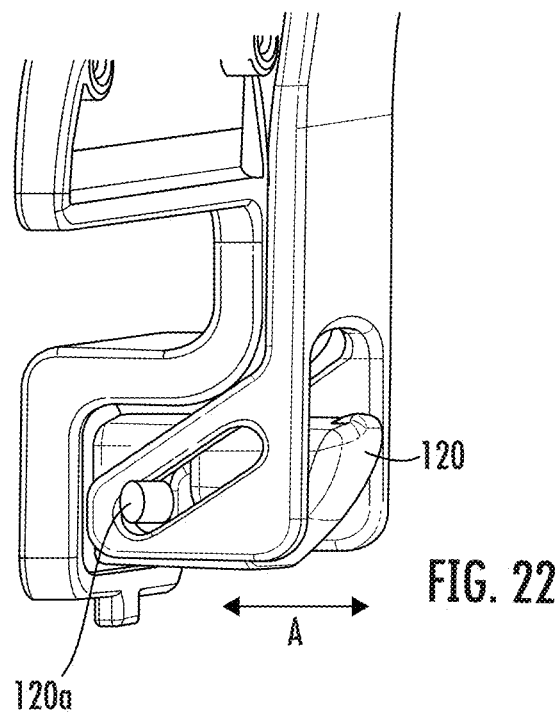
FIG. 22 shows a perspective view of the plunger of FIG. 20 in an unlatched position.

Turning to FIGS. 20 to 22, each set 102 of attachment features of the carrycot 100 defines at least one plunger 120 that is configured to engage the second portion 404*b* of a bayonet 400 when the carrycot 100 is coupled to the bayonet 400. In some examples (not shown), each set 102 of attachment features can define a pair of plungers 120 that are configured to be received in a pair of openings 416 of the bayonet 400. Each plunger 120 can be configured to be received in one of the at least one openings 416 of the bayonet 400. Each plunger 120 is spaced below the receptacle 118 along the vertical direction V. The receptacle 118 can be positioned along or above a midline that is midway between the lower end 104*b* and the upper end 104*a* of the carrycot 100, while each plunger 120 can be disposed below the midline. For example, each plunger 120 can be adjacent the lower end 104*b* of the carrycot 100. In some examples, each plunger 120 can be disposed below the bottom wall 112.

By spacing the receptacle 118 and the at least one plunger 120 from one another, the carrycot 100 can be more resistant to rotation about an axis that extends along the lateral direction A (e.g., through the pair of receptacles 118) when the carrycot 100 is attached to the support frame (e.g., 202, 302) than a comparable carrycot in which the plunger 120 is disposed within the receptacle 118. Moreover, disposing the plunger 120 below the bottom wall 112 can allow the plunger 120 to have a greater stroke length (e.g., travel distance between the latched and unlatched configurations) because the plunger 120 can travel under the bottom wall 112. In contrast, if the plunger 120 were disposed above the bottom wall 112, then the plunger 120 might extend into the receiving space 106 that receives the child if the plunger 120 were not shortened.

The plunger 120 can be configured to transition between a latched position (FIG. 21) and an unlatched position (FIG. 22). The plunger 120 can extend further out from the support 116 along the lateral direction A when in the latched position than in the unlatched position. The carrycot 100 can comprise an actuator 122 that is configured to be actuated by a caregiver to transition the plunger 120 between the latched and unlatched positions. The actuator 122 can include an actuator surface 122*a*, such as a surface of a button, lever, or handle, that is configured to be engaged by a caregiver to actuate the actuator 122. In some examples, the actuator surface 122*a* can be disposed at the upper end 104*a* of the carrycot 100.

Figure 15:
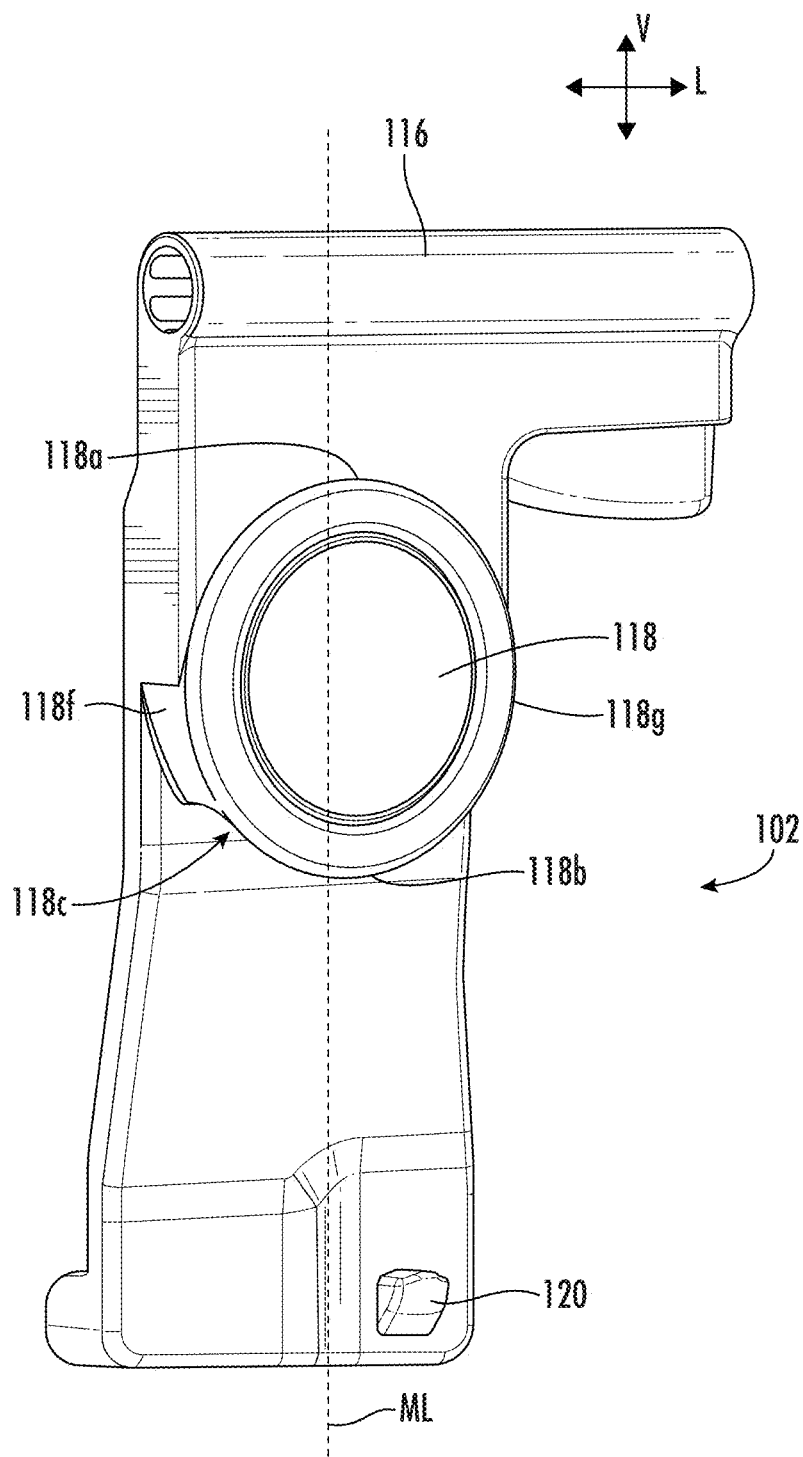
FIG. 15 shows a perspective view of an outer side of the support of FIG. 10 according to one example.
Figure 16:
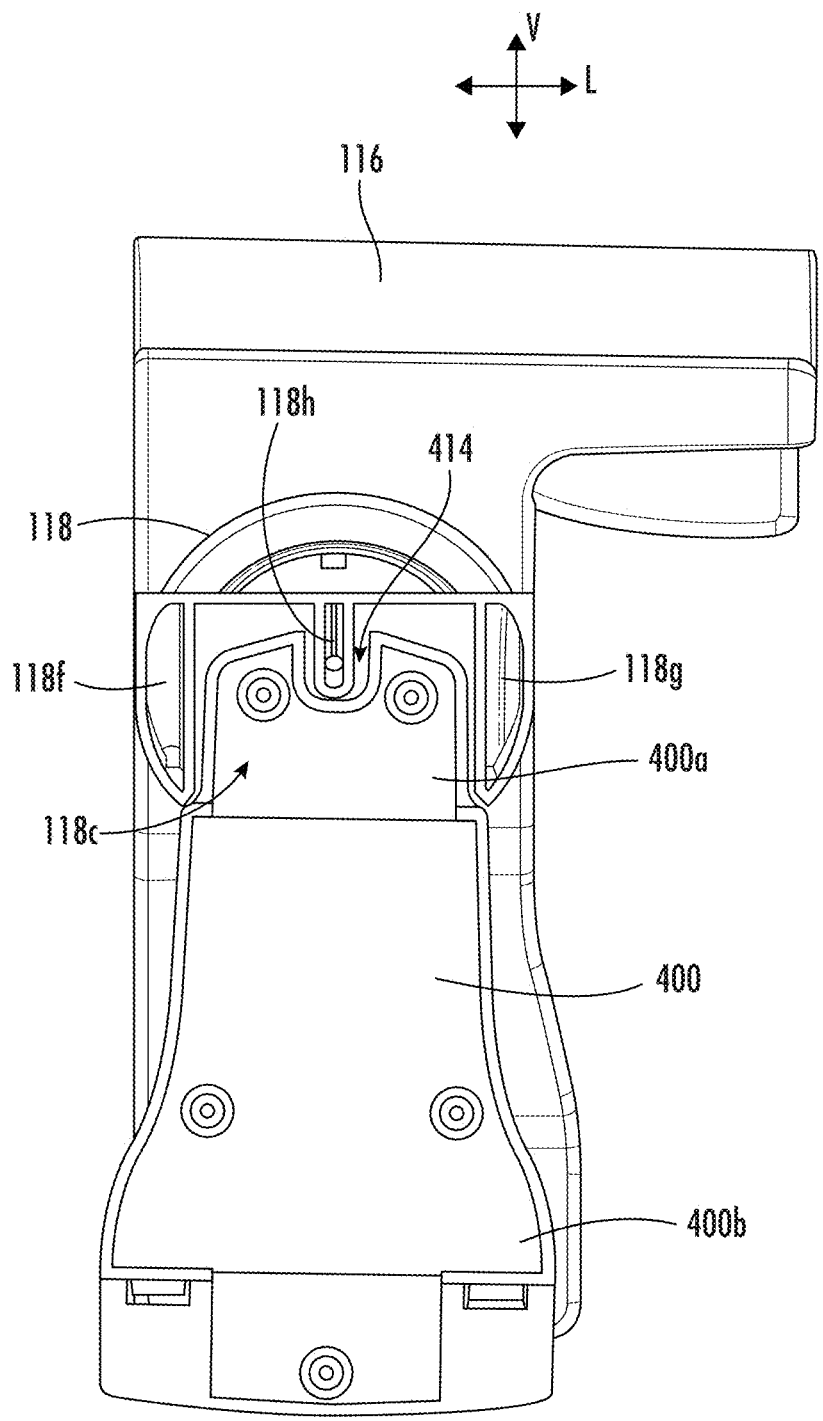
FIG. 16 shows a plan view of the support of FIG. 15 with a surface of a receptacle thereof removed to show a bayonet received in the receptacle.

FIGS. 15 to 17 show one specific example of an actuator 122. It will be understood that the actuator 122 could be implemented in another other suitable manner to transition the plunger 120 between the latched and unlatched positions. In FIGS. 15 to 17, the actuator 122 comprises a lever 126 that comprises the actuator surface 122*a*. The lever 126 is pivotably coupled to a body of the carrycot 100, such as to the support 116, about a pivot axis that is spaced from the actuator surface 122*a*. The lever 126 can be configured to be moved between an unactuated position and an actuated position. For example, the lever 126 can be depressed by a caregiver along a vertical direction to move the lever 126 from the unactuated position to the actuated position. The lever 126 can be resiliently biased towards the unactuated position. In one example, the actuator 122 can comprise a spring 130*d* or resilient member that biases the lever 126.

The lever 126 can be configured to pivot about the pivot axis when transitioned to the actuated position. For example, the actuator surface 122*a* can move along the vertical direction V (i.e., upward or downward) as the lever 126 pivots. The actuator 122 can comprise a linkage 128, such as a rod, shaft, cable, other suitable structure, or combination thereof, that couples the lever 126 to the plunger 120. The linkage 128 can extend inside of the support 116 from the lever 126 to the plunger 120. The actuator 122 is configured such that actuation of the lever 126 causes the linkage 128 to move, thereby causing the plunger 120 to transition between the latched position (FIG. 21) and the unlatched position (FIG. 22). The linkage 128 can be configured to move along the vertical direction V. In one example, the linkage 128 can define a slot 128*a* that is angled with respect to the vertical direction V and the lateral direction A, and the plunger 120 can comprise a protrusion 120*a* that is received in the slot 128*a*. As the linkage 128 moves along the vertical direction V, the protrusion 120*a* rides within the slot 128*a*, thereby causing the plunger 120 to transition between the latched position and the unlatched position.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain examples have been described, these examples are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The words "inward," "outward," "upper," and "lower" refer to directions toward or away from, respectively, the geometric center of the carrycot and its components. It will be understood that reference herein to "a" or "one" to describe a feature such as a component or step does not foreclose additional features or multiples of the feature. For instance, reference to a device having, comprising, including, or defining "one" of a feature does not preclude the device from having, comprising, including, or defining more than one of the feature, as long as the device has, comprises, includes, or defines at least one of the feature. Similarly, reference herein to "one of" a plurality of features does not foreclose the invention from including two or more of the features. For instance, reference to a device having, comprising, including, or defining "one of a protrusion and a recess" does not foreclose the device from having both the protrusion and the recess.

What is claimed:

1. A carrycot configured to be removably coupled to a support frame to support the carrycot above a support surface, the carrycot comprising:
a carrycot frame having a first side and a second side that are spaced from one another so as to define a space therebetween that is configured to support a child therein; and
a set of attachment features that is disposed at the first side and configured to removably attach to a bayonet of the support frame, the set of attachment features comprising (1) a bayonet receptacle configured to receive a first portion of the bayonet and (2) a plunger;
wherein the bayonet receptacle includes an opening; and
wherein the plunger is spaced below the opening of the bayonet receptacle with respect to a vertical direction and is configured to engage an opening in a second portion of the bayonet.

2. The carrycot of claim 1, further comprising: a second set of attachment features disposed at the second side and configured to removably attach to a second bayonet of the support frame, the second set of attachment features comprising (1) a second bayonet receptacle configured to receive a first portion of the second bayonet and (2) a second plunger that is spaced below the second bayonet receptacle with respect to the vertical direction and is configured to engage an opening in a second portion of the second bayonet.

3. The carrycot of claim 1, wherein the plunger is disposed outside of the bayonet receptacle.

4. The carrycot of claim 1, wherein the plunger is disposed adjacent a lower end of the carrycot.

5. The carrycot of claim 1, wherein the carrycot comprises an upper end and a lower end, the bayonet receptacle is disposed along or above a midline between the upper end and the lower end, and the plunger is disposed below the midline.

6. The carrycot of claim 1, wherein the carrycot comprises a bottom wall at a lower end, and the plunger is disposed below the bottom wall.

7. The carrycot of claim 1, wherein:
the carrycot comprises a bottom wall at a lower end;
the carrycot frame comprises an upper rim spaced above the bottom wall; and
the carrycot frame comprises a support disposed at the first side that spaces the upper rim above the bottom wall, wherein the support carries the bayonet receptacle and the plunger.

8. The carrycot of claim 7, wherein:
the carrycot comprises a second set of attachment features disposed at the second side and configured to removably attach to a second bayonet of the support frame, the second set of attachment features comprising (1) a second bayonet receptacle configured to receive a first portion of the second bayonet and (2) a second plunger that is spaced below the second bayonet receptacle with respect to the vertical direction and is configured to engage an opening in a second portion of the second bayonet; and
the carrycot frame comprises a second support disposed at the second side that spaces the upper rim above the bottom wall, wherein the second support carries the second bayonet receptacle and the second plunger.

9. The carrycot of claim 1, wherein:
the first and second sides are spaced from one another along a lateral direction;
the carrycot comprises:
a first end and a second end that are spaced from one another along a longitudinal direction, perpendicular to the lateral direction;
a bottom wall at a lower end; an upper rim spaced above the bottom wall;
a first pair of supports at the first and second ends that space the upper rim above the bottom wall; and
a second pair of supports at the first and second sides that space the upper rim above the bottom wall.

10. The carrycot of claim 1, wherein: the first and second sides are spaced from one another along a lateral direction; a latch is configured to transition between a latched position and an unlatched position, wherein the latch projects out further along the lateral direction when in the latched position than when in the unlatched position.

11. The carrycot of claim 1, wherein the bayonet receptacle has an upper end and a lower end that are offset from one another along a vertical direction, and the bayonet receptacle has an opening that extends upwards therein along the vertical direction and that is configured to receive the first portion of the bayonet therein.

12. The carrycot of claim 1, further comprising an actuator that is configured to transition the plunger between a latched position and an unlatched position.

13. The carrycot of claim 12, wherein the actuator comprises an actuator surface that is configured to be engaged by a caregiver to move the actuator between an unactuated position and an actuated position.

14. The carrycot of claim 13, wherein the actuator comprises: a lever that comprises the actuator surface; and a linkage that couples the lever to the plunger such that movement of the lever causes the plunger to transition between the latched position and the unlatched position.

15. A system, comprising:
the carrycot of claim 1; and the support frame configured to support the carrycot above a support surface, the support frame having a first side and a second side, and having the bayonet disposed on the first side.

16. The system of claim 15, wherein the bayonet comprises the first portion that is configured to be received in the bayonet receptacle, and the second portion defining the opening therein that is configured to receive the plunger.

17. The system of claim 15, further comprising a wheeled carriage or wheelless stand that comprises the support frame.

18. A carrycot configured to be removably coupled to a support frame to support the carrycot above a support surface, the carrycot comprising:

a carrycot frame having a first side and a second side that are spaced from one another so as to define a space therebetween that is configured to support a child therein; and a set of attachment features that is disposed at the first side and configured to removably attach to a bayonet of the support frame, the set of attachment features comprising (1) a bayonet receptacle configured to receive a first portion of the bayonet and (2) a plunger;

the carrycot comprises a bottom wall at a lower end;

the carrycot frame comprises an upper rim spaced above the bottom wall; and the carrycot frame comprises a support disposed at the first side that spaces the upper rim above the bottom wall, wherein the support carries the bayonet receptacle and the plunger;

the carrycot comprises a second set of attachment features disposed at the second side and configured to removably attach to a second bayonet of the support frame, the second set of attachment features comprising (1) a second bayonet receptacle configured to receive a first portion of the second bayonet and (2) a second plunger that is spaced below the second bayonet receptacle with respect to the vertical direction and is configured to engage an opening in a second portion of the second bayonet; and the carrycot frame comprises a second support disposed at the second side that spaces the upper rim above the bottom wall, wherein the second support carries the second bayonet receptacle and the second plunger; and further comprising a bottom wall coupler fixedly attached to the bottom wall, wherein the support comprises a coupler that couples to the bottom wall coupler.

19. The carrycot of claim 18, wherein the carrycot is devoid of a lower rim that attaches the support to the bottom wall.

\* \* \* \* \*